United States Patent
Aoki

(10) Patent No.: US 9,663,102 B2
(45) Date of Patent: May 30, 2017

(54) CONTROL APPARATUS FOR HYBRID VEHICLE

(71) Applicant: Toyota Jidosha Kabushiki Kaisha, Toyota-shi, Aichi-ken (JP)

(72) Inventor: Takanori Aoki, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/137,406

(22) Filed: Apr. 25, 2016

(65) Prior Publication Data

US 2016/0318507 A1    Nov. 3, 2016

(30) Foreign Application Priority Data

Apr. 28, 2015  (JP) ................................. 2015-091260

(51) Int. Cl.

| | |
|---|---|
| *B60W 20/00* | (2016.01) |
| *B60W 20/40* | (2016.01) |
| *B60K 6/26* | (2007.10) |
| *B60K 6/365* | (2007.10) |
| *B60K 6/387* | (2007.10) |
| *B60K 6/445* | (2007.10) |

(Continued)

(52) U.S. Cl.
CPC ............... *B60W 20/40* (2013.01); *B60K 6/26* (2013.01); *B60K 6/365* (2013.01); *B60K 6/383* (2013.01); *B60K 6/387* (2013.01); *B60K 6/445* (2013.01); *B60W 10/06* (2013.01); *B60W 10/08* (2013.01); *B60W 20/10* (2013.01); *B60W 30/18118* (2013.01); *F16H 3/728* (2013.01); *B60K 2006/268* (2013.01); *B60K 2006/381* (2013.01); *F16H 3/724* (2013.01); *F16H 2037/0866* (2013.01); *F16H 2200/201* (2013.01); *F16H 2200/2005* (2013.01)

(58) Field of Classification Search
CPC ...... B60W 20/10; B60W 20/40; B60W 20/50; B60K 6/26; B60K 6/46; B60K 6/365; B60K 2006/268

See application file for complete search history.

(56) References Cited

U.S. PATENT DOCUMENTS

| | | | | |
|---|---|---|---|---|
| 5,967,940 A | * | 10/1999 | Yamaguchi | ............. B60K 6/24 477/107 |
| 6,247,437 B1 | * | 6/2001 | Yamaguchi | ............ B60K 6/445 123/179.3 |

(Continued)

FOREIGN PATENT DOCUMENTS

| | | |
|---|---|---|
| JP | 2003-041966 A | 2/2003 |
| JP | 2009-298373 A | 12/2009 |

*Primary Examiner* — Erez Gurari

(74) *Attorney, Agent, or Firm* — Dinsmore & Shohl LLP

(57) ABSTRACT

A control apparatus for a hybrid vehicle includes an engine, a first motor that cranks the engine, and a second motor for propelling the hybrid vehicle, and is able to perform motor driving by using the first motor and the second motor as driving force sources. The control apparatus includes a controller that controls the first motor. The controller is configured to, during the motor driving, determine whether the first motor is in a single-phase locking state (step S3), when it is determined that the first motor is in the single-phase locking, end the motor driving (step S4), and then start the engine by cranking the engine with the use of the first motor (step S5).

6 Claims, 6 Drawing Sheets

(51) Int. Cl.
  *F16H 3/72* (2006.01)
  *B60K 6/383* (2007.10)
  *B60W 10/06* (2006.01)
  *B60W 10/08* (2006.01)
  *B60W 30/18* (2012.01)
  *B60W 20/10* (2016.01)
  *B60K 6/38* (2007.10)
  *F16H 37/08* (2006.01)

(56) References Cited

U.S. PATENT DOCUMENTS

| | | | | |
|---|---|---|---|---|
| 9,475,378 B2* | 10/2016 | Iwase | ............... | B60K 6/383 |
| 2006/0048734 A1* | 3/2006 | Kataoka | ............... | B60K 6/485 |
| | | | | 123/179.4 |
| 2007/0293362 A1* | 12/2007 | Kamada | ............... | B60K 6/365 |
| | | | | 475/5 |
| 2008/0006457 A1* | 1/2008 | Fujimoto | ............... | B60W 10/02 |
| | | | | 180/65.1 |
| 2009/0021198 A1* | 1/2009 | Okamura | ............... | B60K 6/445 |
| | | | | 318/400.3 |
| 2010/0228412 A1* | 9/2010 | Sah | ............... | B60K 6/365 |
| | | | | 701/22 |
| 2010/0263480 A1* | 10/2010 | Maguire | ............... | F02N 15/022 |
| | | | | 74/7 C |
| 2014/0180441 A1* | 6/2014 | Hiasa | ............... | B60W 20/10 |
| | | | | 700/22 |
| 2014/0180519 A1* | 6/2014 | Niimi | ............... | B60K 6/445 |
| | | | | 701/22 |
| 2014/0288748 A1* | 9/2014 | Ideshio | ............... | B60K 6/48 |
| | | | | 701/22 |
| 2015/0202953 A1* | 7/2015 | Iwase | ............... | B60K 6/383 |
| | | | | 475/5 |
| 2015/0224980 A1* | 8/2015 | Tabata | ............... | B60W 10/06 |
| | | | | 477/5 |

* cited by examiner

| DRIVE MODE | | OWC | C1 | B1 |
|---|---|---|---|---|
| EV | Low | ○ | – | ○ |
| | High | ○ | ○ | – |
| HV | Low | – | – | ○ |
| | High | – | ○ | – |

CONTROL APPARATUS FOR HYBRID VEHICLE

CROSS-REFERENCE TO RELATED APPLICATIONS

The present disclosure claims priority to Japanese Patent Application No. 2015-091260 filed on Apr. 28, 2015, which is incorporated herein by reference in its entirety including the specification, drawings and abstract.

BACKGROUND

1. Technical Field

The present disclosure relates to a control apparatus for a hybrid vehicle including an engine and a plurality of motors as driving force sources and, more particularly, to a control apparatus for a hybrid vehicle that is able to travel by using the power of the motors only and that is able to start the engine with the use of any one of the motors.

2. Description of Related Art

An example of a hybrid vehicle that is able to travel by using a motor is described in Japanese Patent Application Publication No. 2003-041966 (JP 2003-041966 A). The hybrid vehicle includes an engine that is cranked by a motor serving as a starter and a motor for propelling the hybrid vehicle as driving force sources. In a hybrid vehicle of this type, when the hybrid vehicle is performing so-called motor driving, the motor for propelling the hybrid vehicle may lock. A control apparatus for the hybrid vehicle described in JP 2003-041966 A is configured to, when it is determined that the motor locks after a lapse of a starting time of the engine and the torque of the motor needs to be restricted, immediately start the engine. Therefore, in the control apparatus described in JP 2003-041966 A, a start of the engine has already completed at the time when torque is restricted due to locking of the motor, with the result that it is possible to prevent a decrease in the driving torque of the vehicle at the time of starting the engine.

Japanese Patent Application Publication No. 2009-298373 (JP 2009-298373 A) describes a hybrid vehicle configured to restrict load factors (the ratios of output driving force to the maximum driving force) of motors on the basis of the temperatures of inverters that respectively control the motors. Control described in JP 2009-298373 A is such that, when it is determined that the inverter temperatures rise due to an abnormality in a cooling system of the hybrid vehicle, the load factors are restricted and the motor for engine rotation speed control and the motor for propelling the hybrid vehicle are controlled within the corresponding restricted load factors. Therefore, it is possible to avoid or reduce a situation, such as an excessively high inverter temperature.

SUMMARY

The hybrid vehicle described in JP 2003-041966 A includes one motor for propelling the hybrid vehicle. Therefore, if the motor locks and becomes not able to sufficiently output driving force, the engine is started. On the other hand, there is known a hybrid vehicle including two motors (or motor generators). In a hybrid vehicle of this type, one of the motors is mainly used as a motor for propelling the hybrid vehicle (hereinafter, temporarily referred to as drive motor), the other one of the motors is mainly used as a motor for controlling the engine rotation speed or cranking the engine (hereinafter, temporarily referred to as engine control motor), and, when a predetermined condition is satisfied, the engine control motor may be controlled to output driving force for propelling the hybrid vehicle. In the thus configured hybrid vehicle, the engine control motor is also controlled to output large driving force for propelling the hybrid vehicle. Therefore, for example, when a three-phase synchronous motor is used as the engine control motor, the engine control motor may lock in a state where large current flows through any one-phase coil. In such a case, it is conceivable to take measures by, for example, increasing the driving force of the drive motor. However, the apparatus described in JP 2003-041966 A is an apparatus that executes control over the drive motor, so this apparatus is not applicable to control in the case where it is determined that the engine control motor locks.

When the load factors, described in JP 2009-298373 A, are restricted in the case where the engine control motor is determined or estimated to lock, current that is supplied to the engine control motor is restricted to prevent a rise in temperature. On the other hand, torque that the engine control motor is able to output is restricted, so this may interfere with a start (cranking) of the engine.

The present disclosure provides a control apparatus for a hybrid vehicle, which is able to reduce or prevent a shortage of driving force, driving difficulty, or the like, in the case where a motor configured to crank an engine is used as a driving force source for propelling the hybrid vehicle and so-called single-phase locking of the motor is determined.

An aspect of the present disclosure provides a control apparatus for a hybrid vehicle. The hybrid vehicle includes an engine, a first motor that cranks the engine, and a second motor for propelling the hybrid vehicle, and is able to perform motor driving by using the first motor and the second motor as driving force sources. The control apparatus includes a controller that controls the first motor. The controller is configured to, during the motor driving, determine whether the first motor is in a single-phase locking state, when it is determined that the first motor is in the single-phase locking state, end the motor driving, and then start the engine by cranking the engine with the use of the first motor. An aspect of the present disclosure may also be defined as follows. A control apparatus for a hybrid vehicle is provided. The hybrid vehicle includes an engine; a first motor configured to crank the engine; and a second motor used to propel the hybrid vehicle. The hybrid vehicle is configured to perform motor driving by using the first motor and the second motor as driving force sources. The control apparatus includes a controller configured to a) control the first motor, b) during the motor driving, determine whether the first motor is in a single-phase locking state, and c) when it is determined that the first motor is in the single-phase locking state, i) end the motor driving, and ii) start the engine by cranking the engine with the use of the first motor.

In the aspect of the present disclosure, the controller may be configured not to restrict a load factor of the first motor during the motor driving.

In the aspect of the present disclosure, the controller may be configured to determine whether the first motor is in the single-phase locking state on the basis of a required driving force of the first motor and a rotation speed of the first motor.

In the aspect of the present disclosure, the motor driving may include driving in a state where the hybrid vehicle starts moving in an uphill direction.

In the aspect of the present disclosure, the hybrid vehicle may include a power split mechanism that performs differential action by using three rotating elements, the engine may be coupled to a first rotating element that is one of the three rotating elements, the first motor may be coupled to a second rotating element that is one of the three rotating elements, a third rotating element that is one of the three rotating elements may serve as an output element, and torque of the second motor may be added to or subtracted from torque output from the third rotating element.

Alternatively, in the aspect of the present disclosure, the hybrid vehicle may include a first planetary gear mechanism configured to perform differential action by using a fourth rotating element, a fifth rotating element and a sixth rotating element, torque of the engine being input to the fourth rotating element, the first motor being coupled to the fifth rotating element, and the sixth rotating element serving as an output element, a second planetary gear mechanism configured to perform differential action by using a seventh rotating element, an eighth rotating element and a ninth rotating element, the seventh rotating element being coupled to the sixth rotating element, and the second motor being coupled to the eighth rotating element, a first brake mechanism configured to stop rotation of the fourth rotating element in a direction opposite to a rotation direction of the engine, a clutch mechanism configured to selectively couple the ninth rotating element to the first motor, and a second brake mechanism configured to selectively fix the ninth rotating element.

According to the aspect of the present disclosure, in addition to the second motor for propelling the hybrid vehicle, the first motor that is used to crank the engine is used to output driving force for propelling the hybrid vehicle to cause the hybrid vehicle to perform motor driving. In this case, when it is determined that the first motor is in the single-phase locking state, the motor driving is ended, the engine is cranked with the use of the first motor, and the engine is started. When the engine is cranked with the use of the first motor, because the first motor is originally configured to crank the engine, the single-phase locking of the first motor does not occur, so it is possible to smoothly start the engine by quickly cranking the engine. Because driving force that is output from the engine is larger than driving force that is output from the first motor, interference with driving of the hybrid vehicle, such as a shortage of driving force, is avoided or reduced. In addition, because the first motor outputs driving force until the single-phase locking of the first motor occurs, the first motor is driven to a limit in terms of protection of the apparatus, retention of durability, and the like, or a state close to the limit, with the result that it is possible to effectively utilize electric power by increasing an opportunity of motor driving or expanding the region of motor driving. The motor driving may include driving in a state where the hybrid vehicle starts moving. Therefore, it is possible to cause the hybrid vehicle to start moving in a state where the required driving force is large without interference.

According to the aspect of the present disclosure, during the motor driving, the load factor of the first motor is not restricted. Therefore, it is possible to sufficiently increase torque for cranking the engine, and it is possible to quickly crank the engine or start the engine with the use of the first motor. For this reason, it is possible to prevent or reduce a situation, such as a delay of the start of the engine, accompanying excessively large vibrations at the engine start or a shortage of driving force for propelling the hybrid vehicle.

According to the aspect of the present disclosure, it is determined whether the first motor is in the single-phase locking state on the basis of the required driving force and the rotation speed. Therefore, it is possible to end the motor driving and start the engine without a delay, and it is possible to avoid or prevent a situation, such as excessively large current passing through the first motor or a control device for the first motor for a long period of time.

According to the aspect of the present disclosure, when the hybrid vehicle starts moving in an uphill direction, as it is determined that the single-phase locking of the first motor occurs in motor driving, it is possible to start the engine and generate large driving force with the use of the engine. Therefore, it is possible to smoothly start moving in an uphill direction, which requires large driving force.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 3:
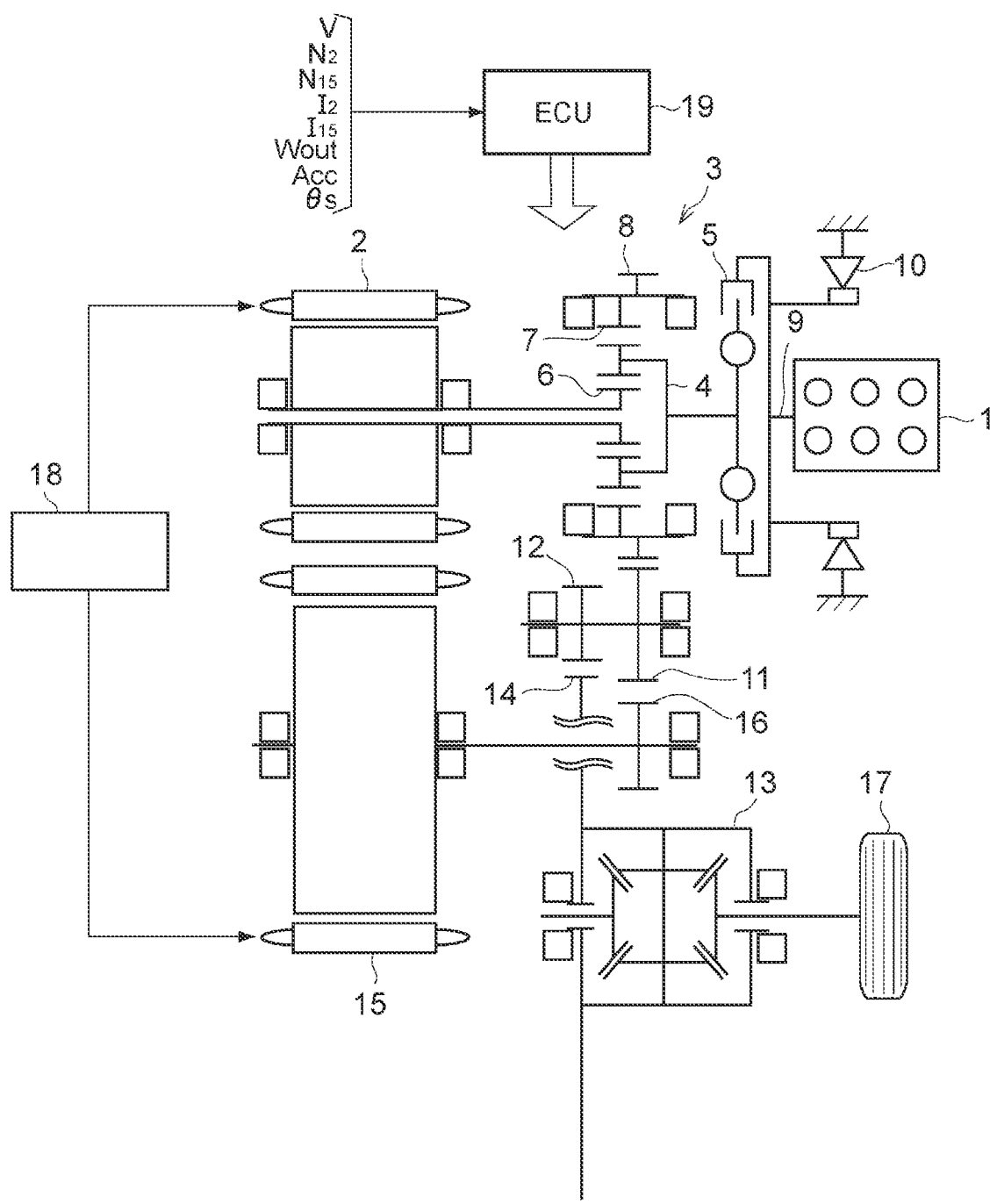
FIG. 3 is a skeletal view that shows an example of a powertrain in a hybrid vehicle to which the present disclosure is applied.

A hybrid vehicle to which an embodiment of the present disclosure is applied includes an engine and two motors as driving force sources. The hybrid vehicle is able to travel by using the driving force of only the motors. An example of the powertrain of the hybrid vehicle is schematically shown in FIG. 3. In FIG. 3, the engine (ENG) 1 and the first motor (MG1) 2 are coupled to a power split mechanism 3. The power split mechanism 3 is a mechanism that performs differential action by using three rotating elements. In the example shown in FIG. 3, a planetary gear mechanism is employed as the power split mechanism 3. The engine 1 is coupled to a first rotating element (for example, a carrier 4) via a spring damper mechanism 5 for reducing torsional vibrations. The first motor (first motor generator: MG1) 2 is coupled to a second rotating element (for example, a sun gear 6). A third rotating element (for example, a ring gear 7) serves as an output member. An output gear 8 is integrated with the third rotating element.

The engine 1 is a multi-cylinder reciprocating engine. A one-way clutch 10 is provided, and blocks the reverse rotation of an output shaft (crankshaft) 9 of the engine 1. The one-way clutch 10 is used to stop the reverse rotation of the engine 1 and applies reaction torque to the carrier 4 at the time when the first motor generator 2 outputs torque for propelling the hybrid vehicle (torque in a negative rotation direction).

The spring damper mechanism 5 is a damper mechanism having a known structure that a drive-side member to which the torque of the engine 1 is transmitted and a driven-side member that is coupled to the carrier 4 are coupled by a coil spring arranged so as to be oriented in a rotation direction. The first motor generator 2 is a motor having a power generation function. Part of the power of the engine 1 is transmitted to the first motor generator 2 via the power split mechanism 3, and transmits negative torque (torque in a direction to stop rotation) resulting from power generation to the sun gear 6 to control the engine rotation speed where necessary.

A counter driven gear 11 is coupled to the output gear 8. A counter drive gear 12 provided coaxially with the counter driven gear 11 is in mesh with a ring gear 14 in a differential gear 13. A drive gear 16 mounted on the rotor shaft of a second motor (second motor generator: MG2) 15 is in mesh with the counter driven gear 11. That is, the torque of the second motor generator 15 is configured to be added to or subtracted from torque that is transmitted from the output gear 8 to drive wheels 17. The second motor generator 15 is a motor having a power generation function as well as the above-described first motor generator 2, and is able to output both positive torque and negative torque.

The motor generators 2, 15 are connected to a power supply unit 18 including inverters and an electrical storage device. An electronic control unit (ECU) 19 is provided. The ECU 19 controls the start or stop of the engine 1 or the torque of the engine 1, and also controls the torque, and the like, of each of the motor generators 2, 15. The ECU 19 is mainly formed of a microcomputer. The ECU 19 is configured to perform computation by using input data or stored data, and output computed results to the engine 1, the power supply unit 18, and the like, as control command signals. Examples of input data that are used in the control include a vehicle speed V, the rotation speeds N2, N15 of the respective motors 2, 15, the current values (or torques) I2, I15 of the respective motors 2, 15, a power (electric power) Wout outputtable from the electrical storage device, the operation amount Acc of an accelerator pedal (not shown) that is operated by a driver for acceleration or deceleration, the inclination Os of a road surface, and the like. A map, or the like for obtaining a required driving force (or a required power) on the basis of an accelerator operation amount is stored in advance.

Figure 4:
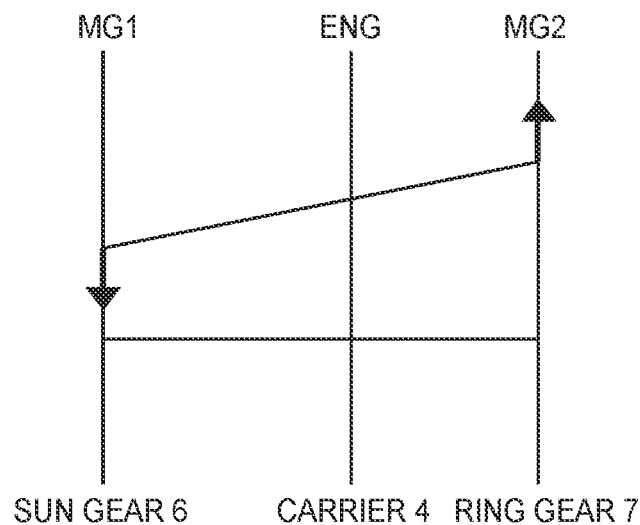
FIG. 4 is a nomograph for a power split mechanism for illustrating an operating state in HV mode.

The hybrid vehicle is able to carry out a mode (HV mode) in which the hybrid vehicle travels by using power that is output from the engine 1 and a mode (EV mode) in which the hybrid vehicle travels while driving the motors by using the electric power of the power supply unit 18. Each mode will be simply described. FIG. 4 is a nomograph that shows the operating state of the power split mechanism 3 in HV mode. Torque in the positive rotation direction is transmitted to the carrier 4 by the engine 1, while negative torque (torque in a direction to decrease the rotation speed) caused by the first motor generator 2 functioning as a generator acts on the sun gear 6 and negative torque resulting from traveling resistance acts on the ring gear 7. That is, power output from the engine 1 is distributed by the power split mechanism 3 to the first motor generator 2 and the output gear 8. The rotation speed of the engine 1 is controlled by the first motor generator 2 to a rotation speed at which the fuel consumption is good. On the other hand, electric power generated by the first motor generator 2 is supplied to the second motor generator 15 and causes the second motor generator 15 to function as a motor, and power converted to electric power by the first motor generator 2 is converted to mechanical power again. That is, torque output from the second motor generator 15 is added to torque output from the output gear 8.

Figure 5:
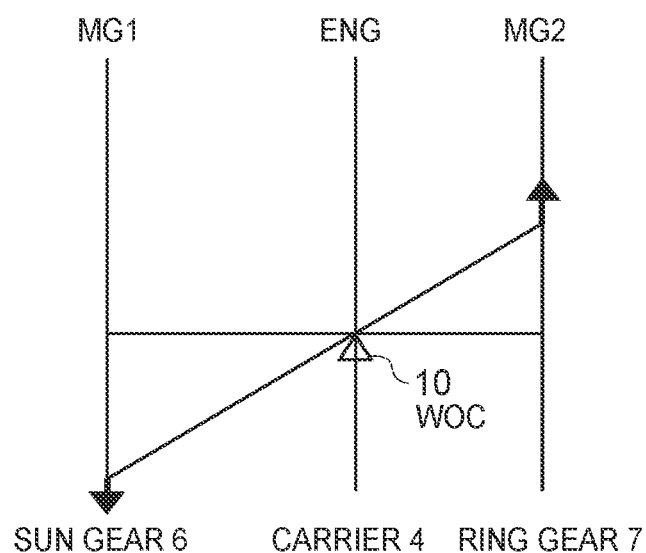
FIG. 5 is a nomograph for the power split mechanism for illustrating an operating state in EV mode.

The EV mode is a drive mode in which the first motor generator 2 and the second motor generator 15 are used as the driving force sources, the motor generators 2, 15 are driven as motors by using electric power output from the electrical storage device of the power supply unit 18, and the hybrid vehicle travels by using the output torque of the motor generators 2, 15. FIG. 5 is a nomograph that shows the operating state of the power split mechanism 3 in EV mode. Each of the first motor generator 2 and the second motor generator 15 functions as a motor. The first motor generator 2 outputs positive torque (torque that increases the rotation speed) in the negative rotation direction. The second motor generator 15 outputs positive torque in the positive rotation direction. In this case, the rotation of each of the engine 1 and the carrier 4 coupled to the engine 1 in the negative rotation direction (direction opposite to the direction in which the engine 1 steadily rotates) is blocked by the one-way clutch 10, with the result that torque in the positive rotation direction is applied to the ring gear 7 due to the torque of the first motor generator 2. In this way, the hybrid vehicle moves forward by using the driving force of these two motor generators 2, 15. During braking, the second motor generator 15 generates electric power to cause negative torque (torque in the direction to stop rotation) at that time to act as braking torque, and the generated electric power is charged into the electrical storage device. In EV mode, only the second motor generator 15 may be used as the driving force source. In this way, the state where the hybrid vehicle travels by using the driving force of only the motor generators 2, 15 is a state of motor driving in the embodiment of the present disclosure.

During motor driving in which the two motor generators 2, 15 are driven as shown in FIG. 5 or at the start in motor driving, when the motor driving is ended and the first motor generator 2 is driven in the positive rotation direction (upward direction in FIG. 5) and accompanying reaction in the positive rotation direction is output by the second motor generator 15, the engine 1 coupled to the carrier 4 is cranked to start. The first motor generator 2 functions to control the rotation speed of the engine 1 in HV mode, and functions as a starter motor that cranks the engine 1 at the time of switching from the EV mode to the HV mode. Therefore, the first motor generator 2 may be regarded as engine control motor.

Figure 6:
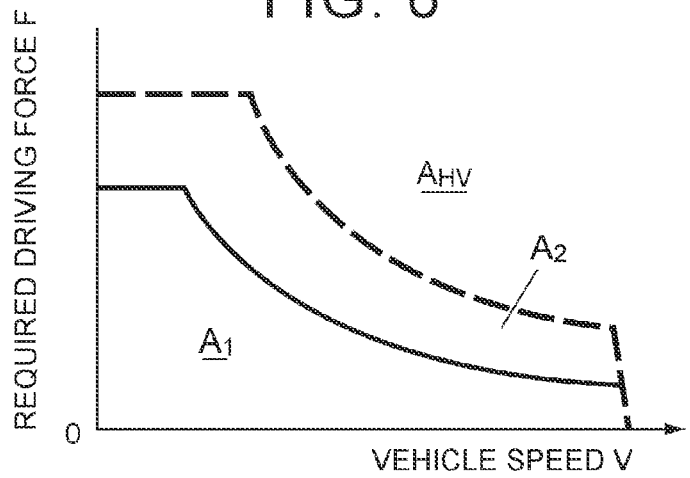
FIG. 6 is a view that schematically shows regions of the modes.

Generatable driving force in HV mode is larger than generatable driving force in EV mode. Generatable driving force in so-called two-motor mode in which the two motor generators 2, 15 are used within the EV mode is larger than generatable driving force in so-called one-motor mode in which the one motor generator 15 is used. An operation region in each mode is determined in advance. An example of each of the operation regions is schematically shown in FIG. 6. In FIG. 6, the reference sign "A1" denotes the region of the one-motor mode, the reference sign "A2" denotes the region of the two-motor mode, and the reference sign "AHV" denotes the region of the hybrid mode. Therefore, the one-motor mode is selected in a state where the vehicle speed V is low and the required driving force F is small, and the two-motor mode or the HV mode is selected as the vehicle speed V or the required driving force F increases. As the required driving force F becomes larger than driving force in the two-motor mode, the two-motor mode is ended, the engine 1 is started, and the drive mode is switched to the HV mode. When a situation, for example, a shortage of actual driving force, has occurred or is predicted, the two-motor mode is ended, and the drive mode is switched to the HV mode.

An example of the shortage of the actual driving force is that it is determined that the single-phase locking occurs, for example, the single-phase locking of the first motor generator 2 that is generating driving force for propelling the hybrid vehicle in two-motor mode has occurred or is predicted. The control apparatus in the embodiment of the present disclosure is configured to execute the following control in order to take measures against the single-phase locking of the first motor generator 2.

Figure 1:
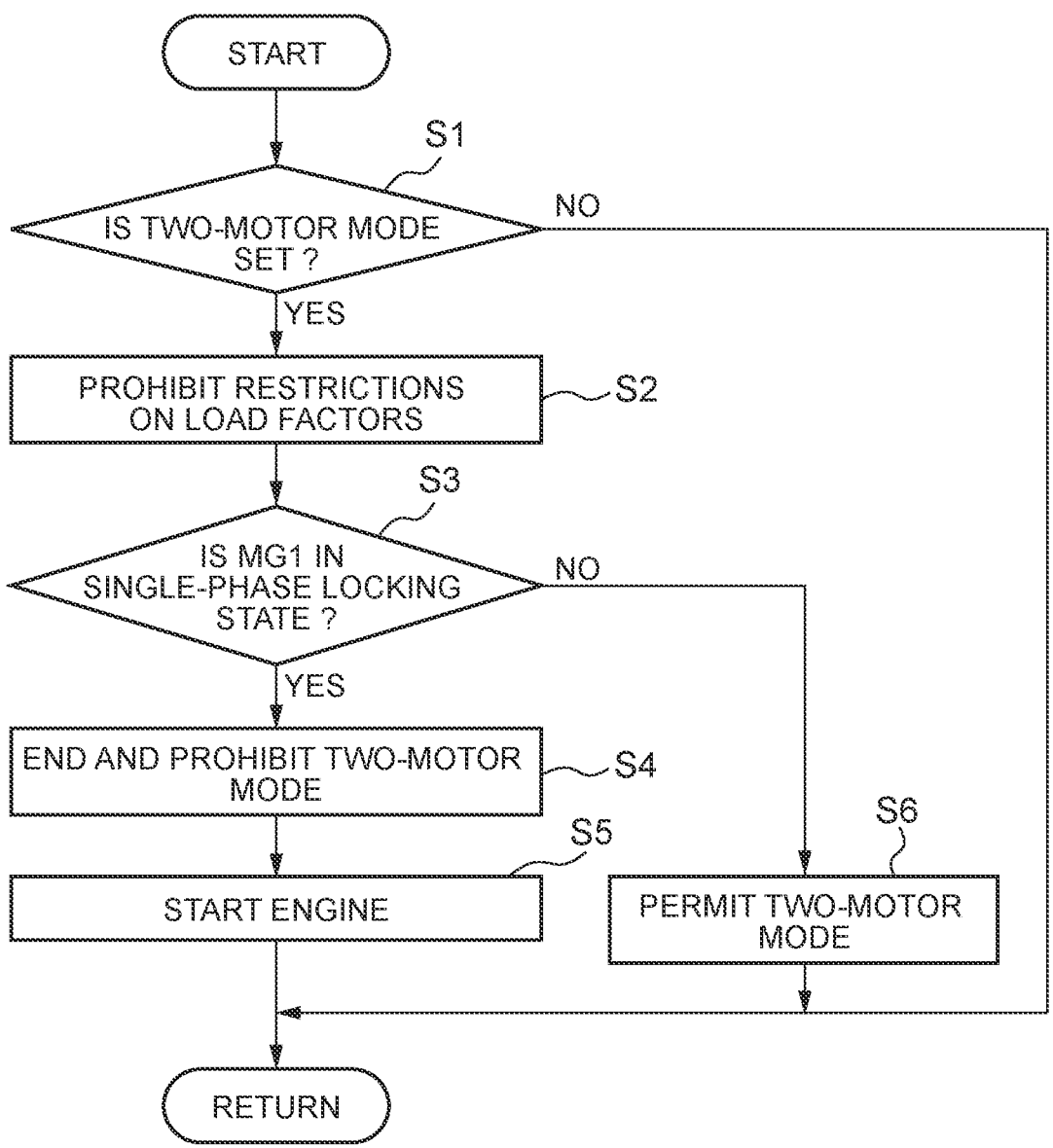
FIG. 1 is a flowchart for illustrating an example of control that is executed by a control apparatus according to the present disclosure.

FIG. 1 is a flowchart for illustrating an example of the control. The flowchart is executed while the hybrid vehicle is traveling or when the hybrid vehicle starts moving. Initially, it is determined whether the above-described two-motor mode is set (step S1). As described above, the region of each mode is determined in advance by the use of the vehicle speed V and the required driving force F, so determination in step S1 may be made on the basis of the vehicle speed V and the required driving force F based on the accelerator operation amount Acc at that time and the map schematically shown in FIG. 6.

When negative determination is made in step S1, the routine shown in FIG. 1 is once ended without any particular control. In contrast, when affirmative determination is made in step S1, restrictions on the load factors of the motor generators 2, 15 or restrictions on the load factor of at least the first motor generator 2 are prohibited (step S2). The load factor is the ratio of a driving force (or torque) to be output to an outputtable maximum driving force (or torque). Restrictions on the load factor are control for decreasing the load factor in response to the temperature of the inverter in the power supply unit 18 when the temperature of the inverter has risen. The control is executed by setting a load factor for an inverter temperature in advance and then acquiring a load factor corresponding to a temperature detected. In step S2, such restriction control is prohibited, and, in two-motor mode, the load factor of at least the first motor generator 2 is not restricted.

Figure 2:
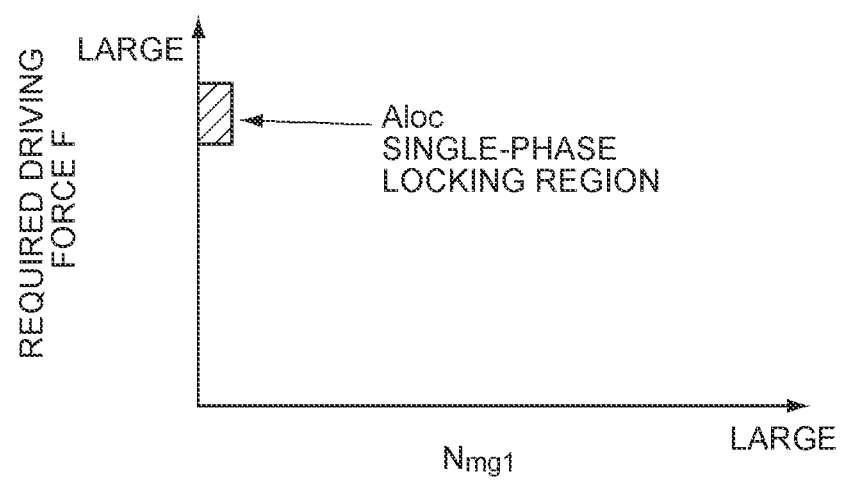
FIG. 2 is a view that schematically shows an example of a map in which a single-phase locking region is set.

Subsequently, it is determined whether the first motor generator 2 is in the single-phase locking state (step S3). The single-phase locking state is a state where large current flows through only any one of the phase coils and the torque of the motor becomes low with respect to a current value, with the result that the temperature of the motor or inverter rises. The single-phase locking occurs in the case where a driving force (torque) command value is large at a low rotation speed. Therefore, a single-phase locking region should be set in advance with a required driving force (or torque command value) F and a rotation speed or vehicle speed V as parameters and prepared as a map for each motor generator to be used, and it is determined whether the motor is in the single-phase locking state by consulting the map on the basis of a detected vehicle speed V and a required driving force. Determination as to the single-phase locking may be carried out further in consideration of a time during which the operating state falls within the single-phase locking region. It may be determined that the motor is in the single-phase locking state when the time exceeds a predetermined determination time. FIG. 2 schematically shows an example of a map in which a single-phase locking region Aloc is set. In FIG. 2, the abscissa axis represents the rotation speed Nmg1 of the first motor generator 2, and the ordinate axis represents the required driving force F. By using such a map, it is possible to easily quickly carry out determination as to the single-phase locking.

When affirmative determination is made in step S3, that is, when it is determined that the first motor generator 2 is in the single-phase locking state, the two-motor mode is ended, and the two-motor mode is prohibited (step S4). For example, control for selecting the drive mode on the basis of the above-described map shown in FIG. 6 is prohibited. Subsequently, the engine 1 is started, control for causing the hybrid vehicle to travel in HV mode is executed (step S5), and then the routine shown in FIG. 1 is once ended. When negative determination is made in step S3, the two-motor mode is permitted (step S6), and then the routine shown in FIG. 1 is once ended.

The control apparatus according to the embodiment of the present disclosure may be configured to execute the above-described control shown in FIG. 1 in the case where the hybrid vehicle starts moving in an uphill direction. Determination as to whether the hybrid vehicle starts moving in an uphill direction may be made on the basis of the above-described inclination Os of a road surface. The inclination θs may be obtained from road data of a stopped position of the hybrid vehicle, detected on the basis of navigation information, or may be obtained on the basis of a detected signal of an inclination sensor (not shown) in the case where the inclination sensor is mounted on the hybrid vehicle. In this case, because the vehicle speed is zero, the required driving force that is contributed by the first motor generator 2 within the required driving force based on the accelerator operation amount falls within the driving force of the above-described single-phase locking region shown in FIG. 2, so it is determined that the first motor generator 2 is in the single-phase locking state.

With the control apparatus configured to execute the above-described control according to the embodiment of the present disclosure, when it is determined that the first motor generator 2 that cranks the engine 1 is in the single-phase locking state in a state where the two-motor mode is selected, a shortage of driving force of the first motor generator 2 is not compensated by the second motor generator 15, but the engine 1 is started to generate driving force for propelling the hybrid vehicle. Therefore, in two-motor mode, the first motor generator 2 outputs driving force to the limit at which driving force is restricted due to the single-phase locking, so the two-motor mode is allowed to be set at the start of the hybrid vehicle, that is, at the time when large driving force is required as in the case where the hybrid vehicle starts moving on an uphill road, with the result that it is possible to perform driving that effectively utilizes electric power. When it is determined that the first motor generator 2 is in the single-phase locking state and, as a result, the driving force of the first motor generator 2 is restricted, the engine 1 is started and the drive mode is switched to the HV mode. Therefore, it is possible to avoid or reduce a shortage of driving force or accompanying deterioration of drivability.

By not restricting the load factor as described above, the first motor generator 2 is allowed to output torque that is not restricted. Therefore, the torque of the first motor generator 2 for cranking the engine 1 becomes sufficiently large, so it is possible to quickly start the engine 1. For this reason, it is possible to avoid or reduce a delay of rising of driving force, and it is possible to avoid or reduce deterioration of vibrations, noise, or the like, by shortening a time during which the engine rotation speed remains at about a resonant rotation speed.

Figure 7:
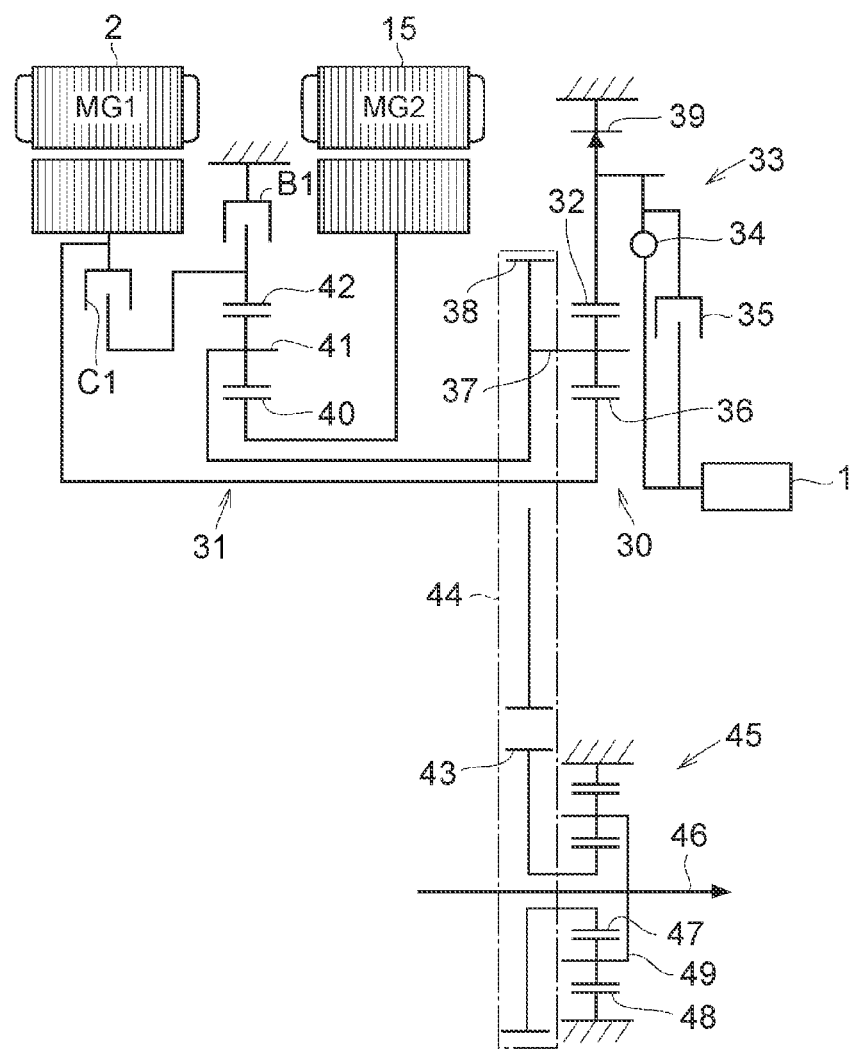
FIG. 7 is a skeletal view that shows another powertrain in a hybrid vehicle to which the present disclosure is applied.

The configuration of the hybrid vehicle to which the present disclosure is applied is not limited to the above-described configuration shown in FIG. 3, and may be, for example, the configuration shown in FIG. 7. The configuration will be simply described. In the configuration shown in FIG. 7, the engine 1, a first planetary gear mechanism 30, the second motor generator 15, a second planetary gear mechanism 31 and the first motor generator 2 are arranged along the same axis in the stated order. The first planetary gear mechanism 30 is a single pinion planetary gear mechanism. The engine 1 is coupled to a ring gear 32 via a damper mechanism 33. The ring gear 32 corresponds to a fourth rotating element in the embodiment of the present disclosure. The damper mechanism 33 includes a clutch 35 arranged in parallel with a spring 34 that absorbs vibrations, and is configured to selectively stop the damper function by the use of the clutch 35.

The first motor generator 2 is coupled to a sun gear 36 of the first planetary gear mechanism 30. The sun gear 36 corresponds to a fifth rotating element in the embodiment of the present disclosure. A driving sprocket 38 is coupled to a carrier 37. The driving sprocket 38 serves as an output member. The carrier 37 corresponds to a sixth rotating element in the embodiment of the present disclosure. A one-way clutch (OWC) 39 is provided. The one-way clutch 39 stops the reverse rotation of the ring gear 32 and the engine 1 coupled to the ring gear 32 (rotation in the direction opposite to the rotation direction during steady operation of the engine 1). The OWC 39 corresponds to a first brake mechanism in the embodiment of the present disclosure.

The second planetary gear mechanism 31 is formed of a single pinion planetary gear mechanism. The second motor generator 15 is coupled to a sun gear 40 of the second planetary gear mechanism 31. The sun gear 40 corresponds to an eighth rotating element in the embodiment of the present disclosure. A carrier 41 is coupled to the carrier 37 in the above-described first planetary gear mechanism 30 and the driving sprocket 38. The carrier 41 corresponds to a seventh rotating element in the embodiment of the present disclosure. A clutch C1 and a brake B1 are provided. The clutch C1 is used to couple a ring gear 42 to the first motor generator 2. The ring gear 42 corresponds to a ninth rotating element in the embodiment of the present disclosure. The brake B1 is used to fix the ring gear 42. The clutch C1 corresponds to a clutch mechanism in the embodiment of the present disclosure. The brake B1 corresponds to a second brake mechanism in the embodiment of the present disclosure.

A driven sprocket 43 is provided in parallel with the driving sprocket 38. A chain 44 is wound around these sprockets 38, 43. The driven sprocket 43 is coupled to an output shaft 46 via a speed reduction mechanism 45. The speed reduction mechanism 45 is formed of a single pinion planetary gear mechanism. The driven sprocket 43 is integrated with a sun gear 47 of the speed reduction mechanism 45. A ring gear 48 is fixed. The output shaft 46 is coupled to a carrier 49.

Figures 8, 9:
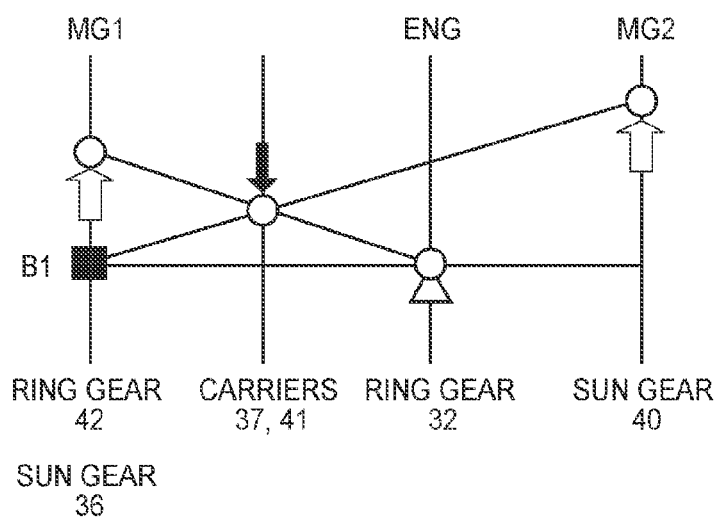
FIG. 8 is a chart that collectively shows engaged and released states of an OWC, clutch and brake for setting each mode and any one of a low state and a high state.
FIG. 9 is a nomograph for planetary gear mechanisms for illustrating an operating state in the low state in EV mode.

In the hybrid vehicle including the powertrain shown in FIG. 7, the EV mode and the HV mode are allowed to be set, and additionally in each of the modes, a low state having a large speed ratio and a high state having a small speed ratio are allowed to be set. FIG. 8 collectively shows engaged and released states of the OWC 39, clutch C1 and brake B1 for setting any one of the low state and the high state in each of these drive modes. In FIG. 8, circle indicates an engaged state, and minus mark indicates a released state.

FIG. 9 shows a nomograph for the planetary gear mechanisms 30, 31 in the low state in EV mode. The first motor generator 2 operates as a motor and outputs torque in the positive rotation direction (rotation direction in the steady operation state of the engine 1). In the first planetary gear mechanism 30, resistance force for causing the hybrid vehicle to move forward is applied to the carrier 37, so torque that rotates the ring gear 32 in the reverse direction acts on the ring gear 32, with the result that the OWC 39 is engaged to stop the rotation of the engine 1, and reaction torque acts on the ring gear 32. Therefore, torque in the positive rotation direction, which is amplified from the output torque of the first motor generator 2 in response to the gear ratio of the first planetary gear mechanism 30 (the ratio of the number of teeth of the ring gear 32 to the number of teeth of the sun gear 36), acts on the carrier 37 and the driving sprocket 38 coupled to the carrier 37.

The second motor generator 15 operates as a motor to output torque in the positive rotation direction. In the second planetary gear mechanism 31, the ring gear 42 is fixed by the brake B1, while, in contrast, the sun gear 40 rotates in the positive rotation direction upon reception of the torque of the second motor generator 15. Therefore, torque in the positive rotation direction, which is amplified from the output torque of the second motor generator 15 in response to the gear ratio of the second planetary gear mechanism 31, acts on the carrier 41 and the driving sprocket 38 coupled to the carrier 41. That is, the motor generators 2, 15 serve as driving force sources to cause the hybrid vehicle to move forward.

In the above-described low state in EV mode, the output torque of the motor generators 2, 15 is amplified and output from the driving sprocket 38, so driving force for propelling the hybrid vehicle increases. When the required driving force exceeds a driving force in the low state or the single-phase locking is determined, the engine 1 is started. As shown in FIG. 9, the torque of the first motor generator 2 is allowed to be applied to the engine 1 coupled to the ring gear 32 of the first planetary gear mechanism 30. Therefore, when torque in the positive rotation direction is applied to the carrier 37 that serves as an output element by the use of the second motor generator 15 to keep the rotation speed of the carrier 37 and the first motor generator 2 outputs torque in the reverse rotation direction (downward torque in FIG. 9) in this state, torque in the positive rotation direction acts on the first motor generator 2. That is, the engine 1 is allowed to be cranked by the first motor generator 2. Therefore, it is possible to execute the above-described control shown in FIG. 1 for the hybrid vehicle configured as shown in FIG. 7, and, in this case as well, similar operation and advantageous effects to those for the above-described hybrid vehicle shown in FIG. 3 are obtained.

The present disclosure is not limited to the above-described specific examples. The power split mechanism 3 shown in FIG. 3 or each of the planetary gear mechanisms 30, 31 shown in FIG. 7 may be formed of a planetary gear mechanism of a different type, such as a double pinion planetary gear mechanism.

What is claimed is:
1. A control apparatus for a hybrid vehicle,
the hybrid vehicle including
an engine;
a first motor configured to crank the engine; and
a second motor used to propel the hybrid vehicle, the hybrid vehicle being configured to perform motor driving by using the first motor and the second motor as driving force sources, the control apparatus comprising:

a controller configured to
a) control the first motor,
b) during the motor driving, determine whether the first motor is in a single-phase locking state, and
c) when it is determined that the first motor is in the single-phase locking state,
   i) end the motor driving, and
   ii) start the engine by cranking the engine with the use of the first motor.

2. The control apparatus according to claim 1, wherein the controller is configured not to restrict a load factor of the first motor during the motor driving.

3. The control apparatus according to claim 1, wherein the controller is configured to determine whether the first motor is in the single-phase locking state on the basis of a required driving force of the first motor and a rotation speed of the first motor.

4. The control apparatus according to claim 1, wherein the motor driving includes driving in a state where the hybrid vehicle starts moving in an uphill direction.

5. The control apparatus according to claim 1, wherein the hybrid vehicle includes a power split mechanism that performs differential action by using three rotating elements,
the hybrid vehicle is configured such that
the engine is coupled to a first rotating element that is one of the three rotating elements,
the first motor is coupled to a second rotating element that is one of the three rotating elements,
a third rotating element that is one of the three rotating elements serves as an output element, and
torque of the second motor is added to or subtracted from torque output from the third rotating element.

6. The control apparatus according to claim 1, wherein
the hybrid vehicle includes
a first planetary gear mechanism configured to perform differential action by using a fourth rotating element, a fifth rotating element and a sixth rotating element, torque of the engine being input to the fourth rotating element, the first motor being coupled to the fifth rotating element, and the sixth rotating element serving as an output element,
a second planetary gear mechanism configured to perform differential action by using a seventh rotating element, an eighth rotating element and a ninth rotating element, the seventh rotating element being coupled to the sixth rotating element, and the second motor being coupled to the eighth rotating element,
a first brake mechanism configured to stop rotation of the fourth rotating element in a direction opposite to a rotation direction of the engine,
a clutch mechanism configured to selectively couple the ninth rotating element to the first motor, and
a second brake mechanism configured to selectively fix the ninth rotating element.

* * * * *